Fig. 1

Patented Jan. 14, 1936

2,027,610

UNITED STATES PATENT OFFICE 2,027,610

SYSTEM FOR THE CONVERSION OF HEAT

Kurt V. Nesselmann, Berlin-Siemensstadt, and Edmund Altenkirch, Neuenhagen, near Berlin, Germany, assignors to Siemens-Schuckertwerke Aktiengesellschaft, Berlin-Siemensstadt, Germany, a corporation of Germany Application December 16, 1933, Serial No. 702,810
In Germany December 21, 1932

6 Claims. (Cl. 62—119)

Our invention relates to a system for the conversion of heat by means of apparatus (heat converters) operating as absorption apparatus when at least four heat reservoirs are available. According to our invention at least four heat reservoirs of different temperature are in heat exchange relation with those parts of the heat converters, in which an evaporation or a condensation and generation or absorption of an operating medium takes place. The heat converter may consist in this case of only one absorption apparatus or also of various apparatus, in which, if desired, the heat-absorbing or the heat-radiating parts are in heat exchange relation with one another. Also even if only one absorption apparatus is used as a heat converter it may be preferable to cause the single vessels of the apparatus to be brought into heat exchange relation with one another.

The heat reservoirs according to the invention may be sources of heat or heat consuming devices. A heat reservoir, from which heat is supplied to the heat converter is denoted hereinafter as a source of heat, whereas a reservoir, to which heat is supplied from the heat converter is designated as a heat consuming device. By the apparatus according to the invention it is possible to attain the various effects either by utilizing them only for the conversion of heat or by bringing them into heat exchange relation with other heat converters. As heat converters according to the invention intermittent or continuous absorption apparatus, steam power plants, steam accumulators, in general all such systems are employed, in which heat of a given temperature is converted to heat of another temperature or into another form of energy.

In such a system intermittent absorption apparatus may be employed to advantage and preferably those which operate with a solid absorbent which forms a chemical compound with the operating medium. With chemical absorbents it is possible at least within certain limits of concentration to generate and to absorb the operating medium at a constant temperature. It is, therefore, possible to supply to or to abstract heat from the single parts of the absorption apparatus at a constant temperature. Since it is essential in many cases to operate within certain constant limits of temperature in the case of heat converting systems, the use of the above-mentioned substances is very advantageous.

However, on the other hand, the intermittent absorption apparatus have the disadvantage that particular devices, when used in connection with heat converting systems, are required to reverse the heat transfer devices when changing periods. Such reversing devices may be dispensed with when using absorption apparatus of the continuous type. For this reason such apparatus are preferable in many cases.

In the accompanying drawings some embodiments of our invention are illustrated in diagrammatic form.

Figure 1:
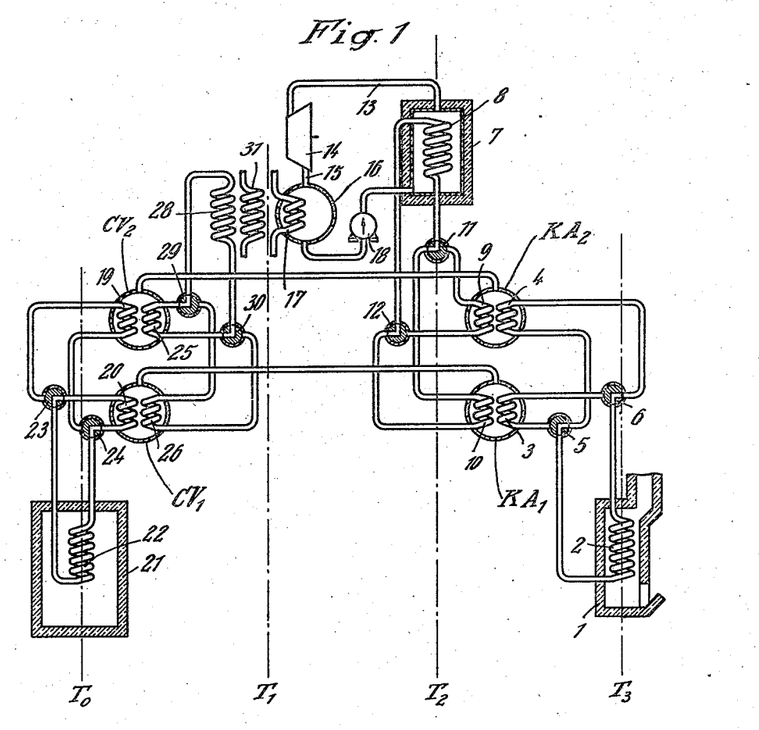
Fig. 1 shows as an embodiment of our invention a system for the conversion of heat, in which two intermittent absorption apparatus are employed.

The system shown in Fig. 1 renders it possible to utilize a source of heat of very high temperature in such a manner as to drive a steam turbine, to produce refrigeration and to supply heat of medium temperature. The generator-absorbers of the intermittent absorption apparatus are designated by KA 1, KA 2 and the corresponding evaporators by CV 1, CV 2. The numeral 1 denotes the source of heat of high temperature ($T_3$). The source of heat may alternately heat either generator-absorber by means of a heat transfer system operating with a circulating medium. The transfer system consists as will be seen from Fig. 1 of a coil 2 contained in the heat generator 1, of the coils 3 and 4 disposed in the respective generator-absorbers and of the circulating conduits in which valves 5, 6 are arranged which serve to reverse the circulation in the system. The heat of absorption at a temperature $T_2$ is transferred from the generator-absorber to the water vapor generator 7 by means of a circulating system which consists of a coil 8 contained in the vapor generator 7 and of the coils 9 and 10 in the respective generator-absorbers contained in the respective circulation conduits.

Valves 11 and 12 which serve to alternately reverse the circulation in the system are also arranged in the circulation conduits.

The heat of absorption is supplied to the water contained in the water vapor generator 7 and is caused to evaporate therein. The vapor passes through a conduit 13, in which the vapor of the waste gases of the source of heat 1 may be, if desired, superheated, into a turbine 14 where it expands. A waste steam conduit 15 leads to a condenser 16. Here the vapor is condensed and the heat of condensation liberated during the condensation is utilized for heating purposes in a transfer system 17 at the temperature $T_1$. The condensate is again forced into the steam generator 7 by means of a pump 18.

The condenser-evaporators CV 1 and CV 2 are provided with heat transfer coils 19 and 20 which appertain to a transfer system, which serves to abstract heat required for the evaporation of the operating medium from a cooling chamber 21 at the temperature $T_0$. To this end, a coil 22 is arranged in the cooling chamber 21, the coil 22 being connected as will be seen from Fig. 1 to the coils 19 and 20. 23 and 24 denote two reversing valves arranged in this system.

The heat of condensation liberated during the generating period is utilized for heating purposes. To this end, the transfer coils 25, 26 located in the condenser-evaporators are used which form with a cooler 28 and the corresponding valves 29 and 30 a heat transfer system. The heat of condensation of the operating medium of the absorption apparatus is transferred from the cooler 28 to a heat transfer system 31, where the heat is utilized at the temperature $T_1$ for heating purposes.

In the valve position shown in Fig. 1 the absorption apparatus KA 2, CV 2 operates during its generating period and the apparatus KA 1, CV 1 during its absorption period. After a certain time has elapsed all valves are rotated in clockwise direction 90° from the position shown in Fig. 1 so that the absorption apparatus KA 2, CV 2 now operates during its evaporating period and the apparatus KA 1, CV 1 during its generating period. Consequently, the system ensures a continuous production of refrigeration for the cooling chamber 21, a continuous withdrawal of heat for heating purposes in the coils 31, 17 as well as the operation of the turbine 4 owing to the continuous supply of heat to the steam generator 7. As compared to the usual absorption refrigeration apparatus (a heat converter with three reservoirs) refrigeration is produced at a somewhat higher temperature and besides additional work is performed in the novel system with four reservoirs with approximately the same quantity of heat.

In the intermittent absorption apparatus strontium bromide may be, for instance, employed as the absorbent and ammonia as the refrigerant (operating medium). Instead of using the condensing apparatus as disclosed in Fig. 1 it may be convenient to employ reabsorption apparatus.

Water may be used in the heat transfer systems for the high temperature and sulphurous acid or ammonia for the low temperature. These media which serve for the transfer of heat are evaporated in the heat-absorbing parts of the heat transfer systems and condensed in the heat-radiating parts thereof.

Figure 2:
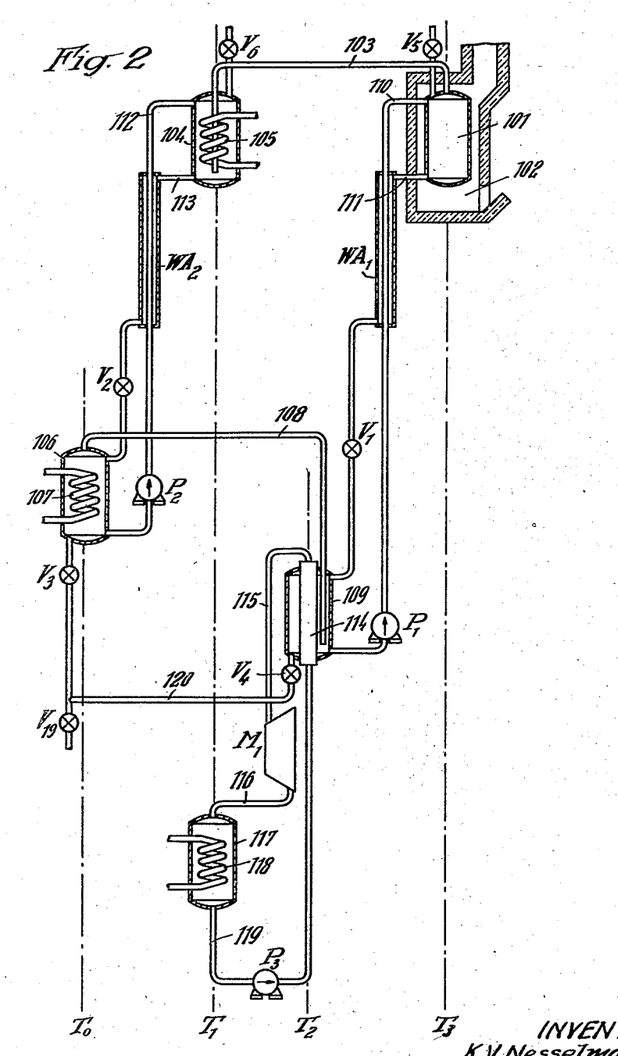
Fig. 2 shows an embodiment, in which a continuous reabsorption apparatus is employed.

Fig. 2 shows a system, in which a continuous reabsorption apparatus is employed and in which a high heating temperature $T_3$ is utilized for the production of refrigeration at the temperature $T_0$, for driving a turbine between the temperatures $T_2$ and $T_1$ and for supplying heat at the temperature $T_1$. 101 denotes the generator of the intermittent absorption apparatus, to which the heat of generation is supplied at a temperature $T_3$ by means of a heating device 102. The vaporous operating medium passes through a conduit 103 into a reabsorber 104, in which a cooling coil 105 is arranged, by means of which heat is given up at the temperature $T_1$. 106 is the evaporator of the continuous absorption apparatus, to which heat required for the evaporation of the operating medium is supplied, for instance, from a cooling chamber by means of a coil 107 arranged in an evaporator. The vaporous operating medium passes from the evaporator 106 through a conduit 108 to the absorber 109 where it is reabsorbed by the weak absorption solution. The circulation conduits 110, 111, 112 and 113 for the absorption solution which are in heat exchange with one another are provided, on the one hand, between the generator 101 and the absorber 109 and, on the other hand, between the reabsorber 104 and the evaporator 106. The heat exchangers are denoted by WA 1 and WA 2.

A throttle valve $V_1$ is arranged in the conduit leading from the generator 101 to the absorber 109 and a pump P 1 which serves to cause a circulation of the solution is arranged in the conduit leading from the absorber 109 to the generator 110. In a corresponding manner a throttle valve $V_2$ is arranged in the conduit 113 and a pump P 2 in the conduit 112. By means of the above-described circulation conduits the absorption solution flows from the generator 101 into the absorber 109, and after being enriched with the operating medium flows back into the generator 101. In the same manner the solution enriched with the operating medium in the reabsorber 104 passes into the evaporator 106, whereas the weak solution is forced back into the reabsorber. The heat of absorption liberated at the temperature $T_2$ serves to evaporate the operating medium of a turbine $M_1$. To this end, a boiler 114, in which water is evaporated for driving the turbine $M_1$ is located in the absorber 109. The vapor passes through a conduit 115—leaving the boiler 114 at the upper part thereof, in which conduit the vapor may, if desired, be superheated by the gaseous products of combustion of the furnace 102—into the turbine where it expands. The waste steam flows through a conduit 116 into the condenser 117. The heat liberated during the condensation is given up to the liquid flowing through a coil 118, the liquid thus heated serving for heating purposes. The condensate flows through a conduit 119 into a feed pump P 3, from which it is conveyed again to the vessel 114. A conduit 120 which leads, on the one hand, to the absorber 109 and, on the other hand, to a discharge conduit in which a valve $V_{19}$ is arranged is connected to the lower part of the evaporator 106. This conduit may be employed for equalizing the quantities of fluid contained in both systems 104, 106 and 101, 109 and for evacuating said systems. To establish the corresponding connections, the conduits are provided with the valves $V_3$, $V_4$ and $V_{19}$.

In the above-described system waste heat may be employed for evaporating the operating medium instead of supplying heat to the vessel 106 from a cooling chamber.

Caustic soda or caustic potash solution or a mixture of both may be employed as the absorbent and steam as the operating medium in the reabsorption apparatus. It is also possible to use different absorbents in the systems 101 and 109 and 104, 106; for instance, in the first system zinc chloride and in the second system water. The operating medium is in this case ammonia. The systems are filled through connections provided with valves $V_5$ and $V_6$. If the substances used in the systems are solid at room temperature it is preferable to provide the system 101, 109 with a device which maintains such a temperature that the substances remain liquid not only after a considerable standstill of the system but also when the latter is being filled. To this end, all conduits and vessels may be provided with a steam heating device which is cut off during the operation of the system.

The system 104, 106 may also be designed as a condensation system. In this case the vessel 104 is a condenser and only a conduit with a valve is necessary between the vessels 104 and 106.

Figure 3:
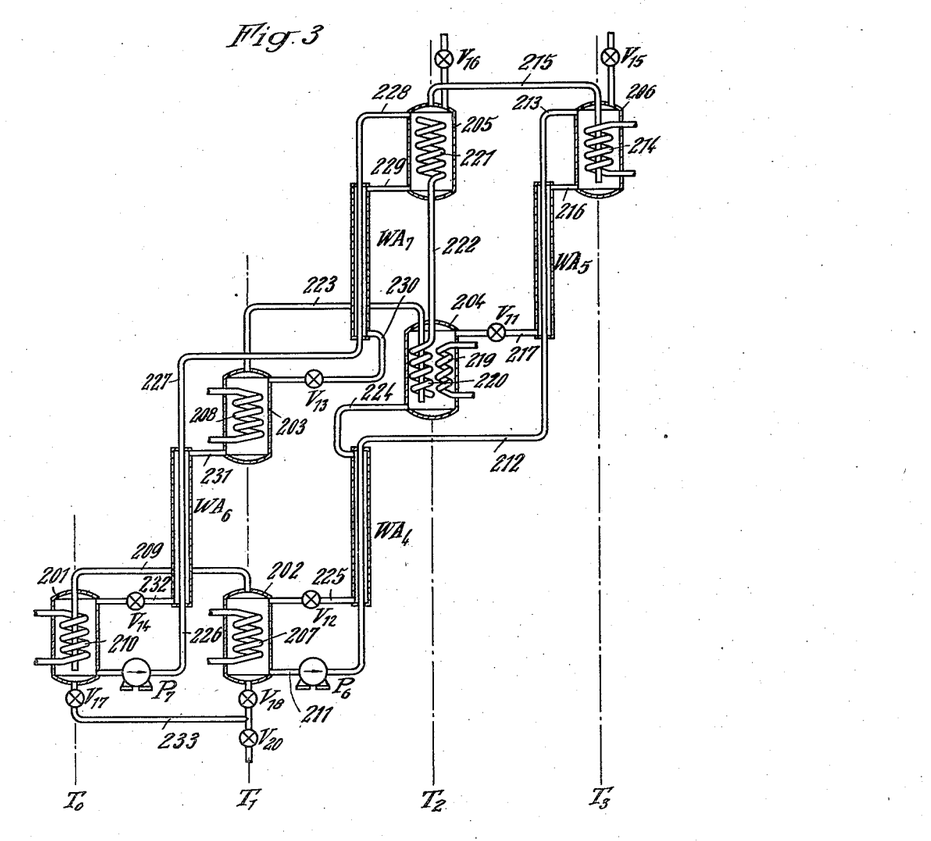
Fig. 3 shows another embodiment in which the heat converter is employed to produce—by applying heat supplied from a reservoir of mean temperature—heat at two higher temperatures and refrigeration at a lower temperature.

Fig. 3 shows another embodiment of the invention, in which the heat converter is utilized to produce—by applying heat supplied from a reservoir of the temperature $T_1$—heat at two higher temperatures $T_2$ and $T_3$ and at a lower temperature $T_0$. The vessels 201 to 206, in which absorption solution of different concentration is contained belong to the heat converter. Heat is supplied to the vessels 202 and 203 at the temperature $T_1$. For this purpose, the coils 207, 208 located in these vessels are employed, through which a heating medium, for instance, a liquid flows. These vessels may be heated, if desired, by waste steam or other sources of heat.

Owing to the application of heat, the operating medium is driven off from the vessel 202 and passes through a conduit 209 into the vessel 201 operating as reabsorber. The vaporous operating medium is absorbed in the reabsorber 201. The heat liberated during the absorption is carried off at the temperature $T_0$ to a heat consumer (not shown) by means of a medium flowing through the coil 210.

The weak solution flows from the lower part of the generator 202 through a conduit 211, a pump P 6 and through a heat exchanger WA 4, a conduit 212, a second heat exchanger WA 5 and a conduit 213 into the upper part of the vessel 206 which operates as absorber. The heat of absorption is carried off from the vessel 206 by means of a coil 214 located therein to a heat consumer (not shown) at the temperature $T_3$.

The vessel 205 operates as a generator. The vaporous operating medium driven off at this point passes through a conduit 215 into the absorber 206 where it is absorbed by the weak solution flowing thereinto through the conduit 213. The solution enriched with the operating medium flows from the absorber 206 through a conduit 216 into the heat exchanger WA 5 and through a conduit 217 provided with a throttling valve $V_{11}$ into the upper part of the vessel 204. In this vessel a further amount of operating medium is absorbed by the solution flowing into the upper part thereof, so that the concentration of the solution is further increased. The heat liberated during the absorption is carried off at the temperature $T_2$, i. e., a portion of the heat is carried off to a heat consumer (not shown) by the liquid flowing through a coil 219, whereas the other portion of heat is supplied to the generator 205 for the purpose of generating the operating medium. To this end, a heat transmission system is employed which consists of a coil 220 located in the container 204, of a coil 221 arranged in the vessel 205 and of a conduit 222. In this system a liquid operates in the usual manner, evaporating in the lower portion and condensing in the upper portion. Vaporous operating medium is supplied through a conduit 223 from the vessel 203 which operates as a generator to the vessel 214 operating as the absorber.

The absorption solution of high concentration flows from the lower part of the absorber 204 into the upper part of the generator 202 through a conduit 224, the heat exchanger WA 4 and through a conduit 225 provided with a valve $V_{12}$.

Between the vessel 201, 203, 205 a circuit for the circulation of the solution is provided in the same manner as between the vessels 202, 204 and 206. From the lower part of the absorber 201 the absorption solution of high concentration forced by a pump P 7 passes into the upper part of the generator 205 through a conduit 226, a heat exchanger WA 6, a conduit 227, a heat exchanger WA 4 and through a conduit 228. As soon as a portion of the operating medium has been expelled the absorption solution of a correspondingly lower concentration flows from the lower part of the generator 205 through a conduit 229, a heat exchanger WA 7, a conduit 230 provided with a valve $V_{13}$ into the upper part of the generator 203. There, further operating medium is abstracted from the solution in the usual manner by evaporation and the weak solution flows from the lower part of the generator 203 back into the upper part of the absorber 201 through a conduit 231, heat exchanger WA 6 and through a conduit 232 provided with a valve $V_{14}$. The absorber 201 is connected to the generator 202 by a conduit 233, which is provided with a discharge conduit and the valves $V_{17}$, $V_{18}$, $V_{20}$. The conduits provided with the valves $V_{15}$, $V_{16}$ are used for filling the fluids.

The heat converter is, for instance, filled with aqueous caustic soda solution.

The system 201, 203 may also be designed as a condensation system. In case the vaporous operating medium coming from the vessel 202 through the conduit 209 is condensed in the vessel 201; the condensate passes into the vessel 205 through the pump P 7, the conduits 226, 227, the heat exchanger WA 7 and through the conduit 228. The heat exchanger WA 6 is omitted in this case. A portion of the liquid operating medium is evaporated in vessel 205 by the heat transferred from the vessel 204 and the vaporous operating medium flows into the condenser 206 through the conduit 215. The remaining portion of the operating liquid leaves the vessel 205 through the conduit 229, heat exchanger WA 7, conduit 230, valve $V_{13}$ and passes into the vessel 203 where it is evaporated by application of heat.

Under these circumstances it is preferable to insert an equalizing conduit with a valve between the vessels 203 and 201.

Accordingly, the above-described heat converter may also be employed to supply heat at the temperatures $T_0$, $T_2$ and $T_3$ and to produce heat at the temperature $T_1$. In this case the functions of the single vessels are simply reversed.

The heat liberated in the absorber 201 may be carried off to a heat consumer, for instance, to river water.

Figure 4:
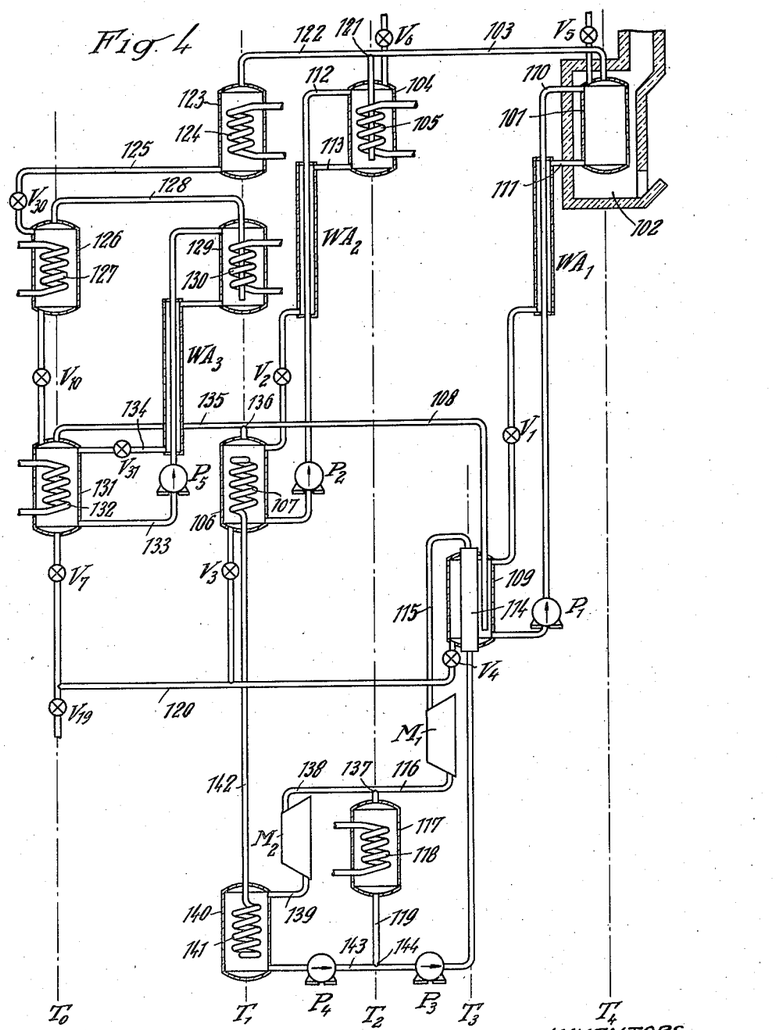
Fig. 4 shows a system in which two continuous reabsorption apparatus are employed for the production of refrigeration at a low temperature and for driving two turbines.

Fig. 4 shows a system, in which two continuous reabsorption apparatus are employed, and in which a high heating temperature $T_4$ is utilized for the production of refrigeration at the temperature $T_0$, for driving a turbine between the temperatures $T_2$, $T_1$ and a second turbine between the temperatures $T_3$, $T_2$ as well as for supplying heat at the temperature $T_2$. 101 denotes the generator of the intermittent absorption apparatus. The heat of generation is, for instance, supplied to the generator at the temperature $T_4$, by means of a heating device 102. The vaporous operating medium passes through a conduit 103 into a reabsorber 104, in which a cooling coil 105 is located. 106 is the evaporator of one of the continuous reabsorption apparatus. The heat required for expelling the operating medium is supplied to the evaporator 106 by means of a coil 107 arranged therein. The vaporous operating medium passes from the evaporator 106 into the absorber 109 through a conduit 108 and is again taken up in the reabsorber 109 by the weak absorption solution. The conduits 110, 111, 112, 113 for the circulation of the absorption solution which are in heat exchange relation with one another are provided between the generator 101 and the absorber 109, one the one hand, and the reabsorber 104 and the evaporator 106, on the other hand. These heat exchangers are designated in Fig. 4 by WA. In the conduit leading from the generator 101 to the absorber 109 a valve $V_1$ is inserted and in the conduit 110 leading from the absorber to the generator a pump P 1 is provided for circulating the solution. In a corresponding manner a valve $V_2$ is arranged in the conduit 113 and a pump P 2 in the conduit 112. By means of the above-described circuits the weak absorption solution passes from the generator 101 to the absorber 109, from which it flows after being enriched with the operating medium back into the generator 101. In the same manner the solution enriched with the operating medium in the reabsorber 104 passes into the evaporator 106, whereas the weak solution after evaporating flows back into the reabsorber 104. The heat of condensation liberated at the temperature $T_3$ serves to heat the operating medium of a turbine $M_1$. To this end, a boiler 114, in which the liquid operating medium serving to drive the pump is evaporated, is arranged in the absorber 109. The vapor passes into the turbine $M_1$ where it expands through a conduit 115 connected to the upper part of the boiler 114. The waste steam passes through a conduit 116 into the condenser 117. The heat liberated during the condensation is given up to the liquid flowing through a coil 118 and which is employed for heating purposes. The condensate flows through a conduit 119 into a feed pump P 3, from which it is again conveyed to the vessel 104. The conduit 103 leaving the generator 101 and conveying the vaporous refrigerant branches off at point 121. A portion of the vaporous refrigerant is reabsorbed in the reabsorber 104 at the temperature $T_2$, whereas the other portion passes through a conduit 122 into the condenser 123 where the heat of reabsorption is carried off at the temperature $T_1$ by means of the cooling coil 124 arranged therein.

The liquid operating medium flows through a conduit 125, a valve $V_{30}$ into the evaporator 126, to which the heat required for the evaporation of the refrigerant is supplied, for instance, from a cooling chamber (not shown) at the temperature $T_0$ by means of a coil 127 arranged in the evaporator 126. The vaporous operating medium passes from the evaporator 126 through a conduit 128 into a reabsorber 129 where it is absorbed by the weak absorption solution contained therein. The heat liberated during the absorption is carried off at the temperature $T_1$ by means of a cooling water coil 130. An evaporator 131, in which a coil 132 is arranged which supplies heat at the temperature $T_0$ required for the evaporation of the operating medium, cooperates with the reabsorber 129. The absorption solution circulates between the vessels 129 and 121 through conduits 133, 134. A pump P 5 is provided in the conduit 133 to cause a circulation of the absorption solution and a valve $V_{31}$ is provided in the conduit 134 to regulate the circulation. The said circulation conduits are arranged at the central portion thereof to provide a heat exchanger WA 3. The operating medium expelled from the evaporator 131 passes through a conduit 133 and the conduit 108 to the point 138 where it combines with the operating medium expelled from the evaporator 106 and returns with the latter to the absorber 109 through the conduit 108.

The waste steam conduit 116 leaving the turbine $M_1$ branches off at point 137. A portion of the waste steam passes in the above-described manner into the condenser 117, whereas the other portion is supplied to a turbine $M_2$ through a conduit 138. The operating medium (steam) expanded in the turbine $M_2$ is finally supplied to a condenser 140 through a conduit 139 and condensed therein.

The heat liberated during the condensation is carried off by means of a heat transfer system consisting of a coil 141 contained in the condenser 140, of the conduit 142 and of the coil 107 contained in the evaporator 106. In this manner, the heat of condensation of the waste steam of the turbine $M_2$ is employed for evaporating the operating medium in the evaporator 106. The liquid operating medium in the turbine is conveyed from the condenser 140 by means of a pump P 4 and a conduit 143 to point 144 where it combines with the condensate coming from the condenser 117 through the conduit 119 and is forced back together with the condensate into the vessel 114 through the pump P 3. At the lower part of the evaporator 106 a conduit is connected to the valves $V_3$, $V_4$, $V_7$ and $V_{19}$ which serves the same purposes as described in Fig. 1. A further equalizing conduit 143 with a valve $V_{10}$ is arranged between the vessels 126 and 131.

In the system 101, 109 liquid zinc chloride may be employed as the absorption medium, whereas in the other system water, ammonia being used as the operating medium. According to the invention the system 123, 126 may also be designed as reabsorption system. In this case the vessel 123 is designed as reabsorber and the connection of both vessels 123 and 126 is designed in a manner corresponding to the connection between the vessels 129, 131.

Figure 5:
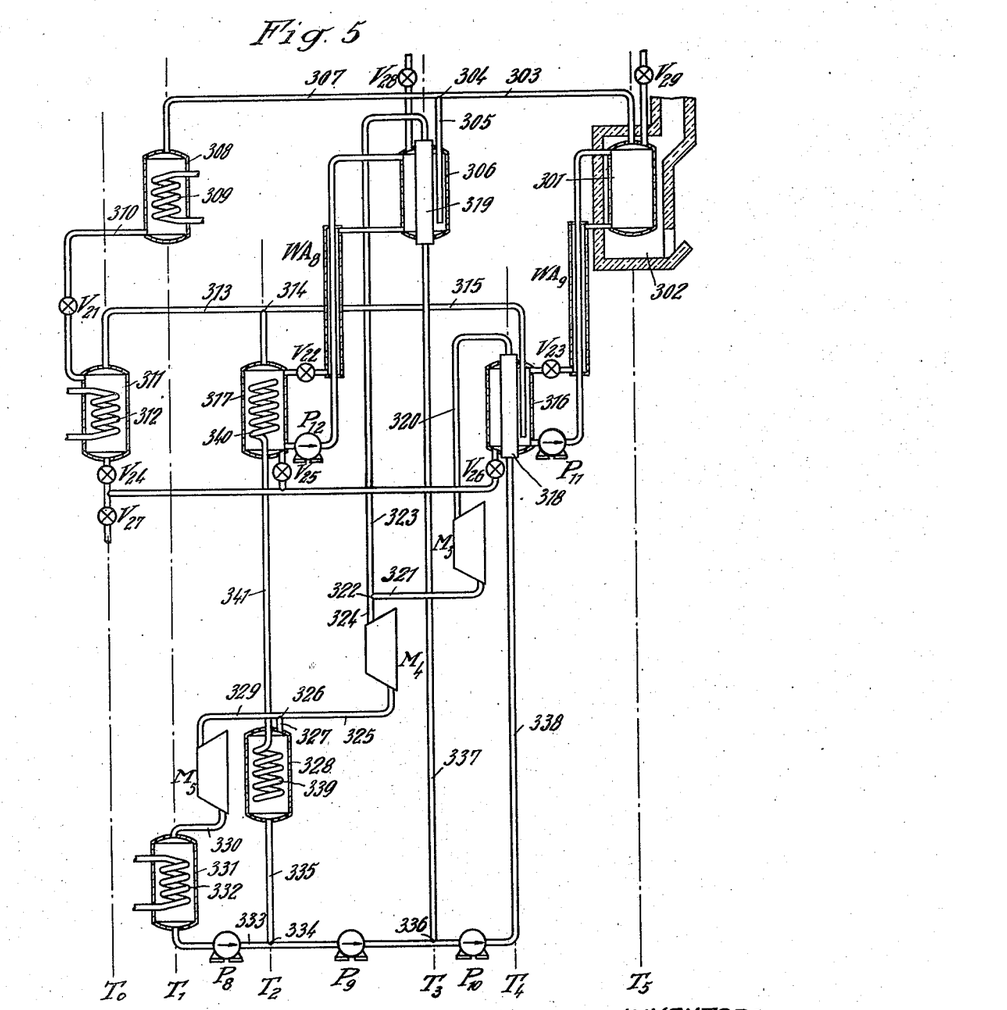
Fig. 5 shows a further embodiment in which a heat converter is employed for driving three turbines of different pressure stages and for producing refrigeration at a low temperature.

Fig. 5 shows as a further embodiment of the present invention a system, in which six heat reservoirs of different temperature are in heat exchange relation with parts of a heat converter and in which the source of heat of higher temperature ($T^5$) is utilized to drive three turbines of different pressure stages and to produce refrigeration at a low temperature. Heat is supplied at the temperature $T_5$ to the generator 301 of the heat converter by means of the heating device 302. The vaporous operating medium thereby expelled passes through a conduit 303 to a branch point 304. At this point a portion of the vapors passes through a conduit 305 into a reabsorber 306, whereas the other portion passes through a conduit 307 into a condenser 308. The operating medium is condensed in the condenser by means of a coil arranged therein which carries off the heat of condensation at the temperature $T_1$. The condensate flows into the evaporator 311 through a conduit 310, in which a throttle valve $V_2$ is arranged. A coil 312 through which the heat required for the evaporation is supplied, for instance, from a cooling chamber is located in the evaporator 311. The vaporous refrigerant passes into the absorber 316 through a conduit 313, a point 314 and through a conduit 135.

The reabsorber 306 is in heat-exchange relation with an evaporator 317 as will be seen from Fig. 5 through a heat circulating system for the absorption solution and a heat exchanger WA 8. A pump P 12 serves to circulate the solution and a valve $V_{21}$ to regulate the same.

A similar circulating system for the absorption liquid with a heat exchanger WA 9 is arranged between the generator 301 and the absorber 316. In this case a pump P 11 serves to circulate the liquid and a valve $V_{23}$ to control the circulation of the same.

The heat liberated in the absorber 316 at the temperature $T_4$ and in the reabsorber 306 at the temperature $T_3$ is utilized to evaporate an operating medium for three turbines $M_3$, $M_4$, $M_5$. To this end, a steam boiler 318 is arranged in the absorber 316 and a steam boiler 319 in the reabsorber 306. The steam produced in these boilers may be superheated by the gaseous products of combustion of the furnace 302. The steam passes from the steam boiler 318 through a conduit 320 into a turbine $M_3$, whence it passes through a waste steam conduit 321 to a point 322 where it combines with the steam supplied through a conduit 323 and generated in the steam boiler 319. From this point the steam flows through a conduit 324 into the turbine $M_4$ of the medium pressure stage, whence the waste steam is transferred to a branch point 326 through a conduit 325. A portion of the waste steam flows through a conduit 327 into a condenser 328, whereas the other portion passes through a conduit 329 into the turbine $M_5$ of the lowest pressure stage. The waste steam passes from the turbine $M_5$ through a conduit 330 into a condenser 331 where it is condensed at the temperature $T_1$ by means of the water cooling coil 332. The condensate is forced by a pump $P_8$ through a conduit 333 to the point 334, where it combines with the condensate coming from the condenser 328 through a conduit 335. A pump P 9 forces the condensate from the point 334 to the point 336, whence a portion of the condensate passes through a conduit 337 back into the steam boiler 319, whereas the other portion is supplied to a pump P 10 which feeds this portion of condensate back into the steam boiler 318 through a conduit 338.

A heat transfer system consisting of an evaporator coil 339 contained in the condenser 328 of a condenser coil 340 contained in the evaporator 317 and of the conduit 341 and operating with a liquid which alternately evaporates and condensates, operates between the condenser 328 for the waste steam coming from the turbine $M_4$, on the one hand, and the evaporator 317, on the other hand. In this manner the heat of condensation is supplied at the temperature $T_2$ to the evaporator 317.

The vessels 311, 317, 316 are connected by a conduit which is provided with the stop valves $V_{24}$, $V_{25}$, $V_{26}$, $V_{27}$. This conduit may be employed, for instance, for evacuating the systems. To fill the systems the vesels 301 and 306 are provided with conduits, in which the valves $V_{29}$ and $V_{28}$ are arranged.

The system 308, 311 may be designed as reabsorption system. In this case different solvents with the same operating medium may be employed in the three different systems (301, 316; 306, 317; 308, 311).

Figure 6:
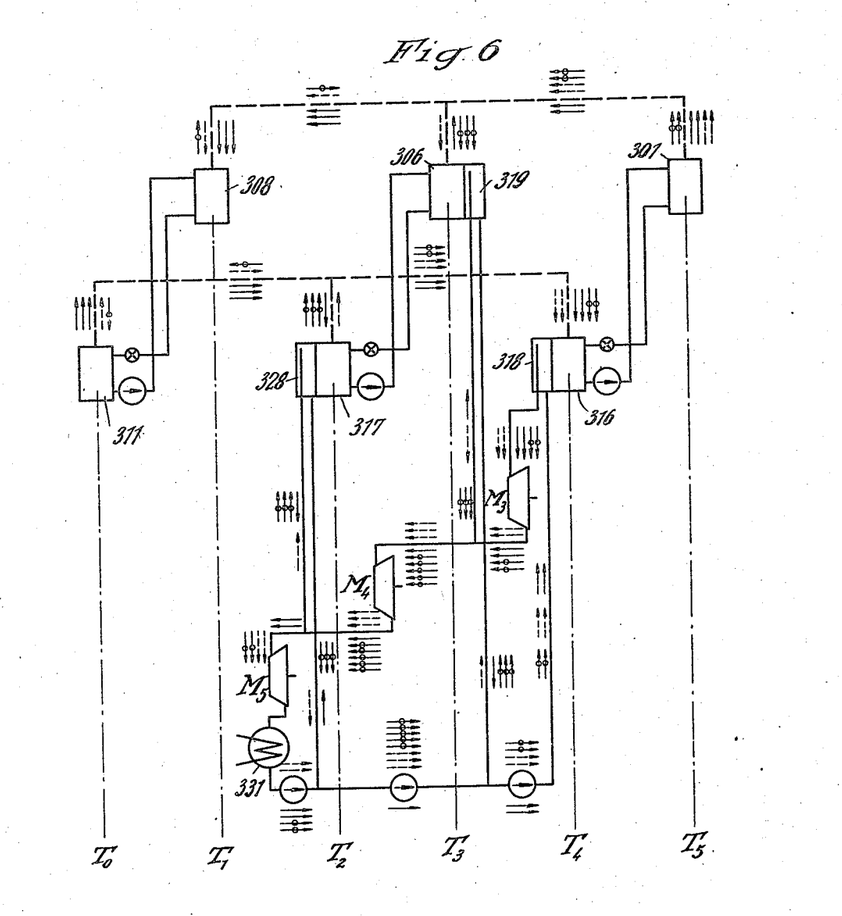
Fig. 6 is a diagram illustrating the circulation of the operating medium in the system shown in Fig. 5.

A thermal power plant consisting of a heat converter and thermal power engines as disclosed in the system of Fig. 5 is again shown in diagrammatic form in Fig. 6. Such a plant may be employed either to attain an increased production of refrigeration with a decreased production of power or to attain an increased production of power with a decreased production of refrigeration. Whether more power or refrigeration will be produced depends upon how the vaporous operating medium leaving the generator 301 is distributed over the vessels 306 and 308.

If, for instance, all vaporous operating medium generated in the generator 301 is taken up in the vessel 306 no vaporous operating medium is left for the system which produces refrigeration. In this case no refrigeration will, consequently, be produced.

However, since the quantity of vaporous operating medium supplied to the vessel 306 is very great, the quantity of steam which is available for producing the steam necessary to drive the turbine $M_4$ is also very great. On the other hand, a corresponding great quantity of the operating medium must be evaporated in the vessel 317, which implies that a great quantity of heat is also abstracted from the vessel 328.

In this manner the steam produced in excess in the vessel 319 and utilized in the turbine $M_4$ is condensed in the vessel 328. With decreasing production of refrigeration the power developed by the turbine $M_4$ is, consequently, increased and reversely.

If an increased production of refrigeration is to be attained with decreased demand of power all the steam flowing through the turbine $M_3$ may be, for instance, condensed in the vessel 319. In this case the vessel 306 of the heat converter acts as a generator. Accordingly, the vessel 317 of the heat converter must, therefore, operate as an absorber. The heat of absorption is then used to produce steam which is utilized in the turbine $M_5$. In this case the turbine $M_4$ does not perform any work. All intermediate stages may, of course, be also adjustable.

If a heat consuming means is available at the temperature $T_0$ which may, for instance, consist in the form of stored cold or in cold as available in nature the operation of the vessels 308 and 311 may be also reversed. In this case the vessel 311 acts as a condenser and the vessel 308 as an evaporator. The heat liberated in the condenser 331 may then be utilized to evaporate the operating medium in the vessel 308.

The dotted and solid arrows in Fig. 6 are to indicate the quantity of operating medium circulating in the heat converter and in the thermal power plant. The solid arrows indicate a case in which the production of refrigeration is increased and the production of power decreased, whereas the dotted arrows indicate a case of decreased production of refrigeration and an increased production of power. The arrows provided with a circle illustrate a form of operation in which the vessel 311 gives up heat, for instance, to a heat reservoir available in nature (cold available in the atmosphere).

The present invention shows how heat in the case of heat converters operating as absorption apparatus with four or more heat reservoirs may be converted as far as possible in a reversible manner within various ranges of temperature. According to the invention absorption apparatus with liquid pumps and valves as well as apparatus with neutral gases may be employed; furthermore, such apparatus in which the difference of pressure in the corresponding vessel is maintained by columns of liquid. By bringing the heat converters with the heat power plant into heat exchange relation it is possible as the above embodiments show to produce various thermal effects and to perform work at the same time. It is, for instance, possible to supply heat at a very high temperature and to prevent the thermal power engines from coming into contact with this higher temperature. Moreover, a reservoir of low temperature available in nature may be utilized to produce power without it being necessary to cause the medium operating in the thermal power engine to reach these low temperatures. It is, therefore, possible to utilize great differences of temperature in a reversible and easy manner for the production of thermal power without departing from the usual design of the power plants.

Furthermore, it is also possible to produce refrigeration and to perform work as well as to give up heat, if desired, by the above described means.

We claim as our invention:

1. In a system for the conversion of heat in which at least four quantities of heat are totally supplied or carried off at different temperatures, a heat converter closed against the outside and operating as an absorption apparatus, said heat converter comprising at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, at least one of said heat consuming devices serving to supply heat to a system combined with said heat converter.

2. In a system for the conversion of heat in which at least four quantities of heat are totally supplied or carried off at different temperatures, a heat converter closed against the outside and operating as an absorption apparatus, said heat converter comprising at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, at least two heating systems being combined with said heat converter, at least two of said heat consuming devices comprising heating means serving to operate said heating systems.

3. In a system for the conversion of heat in which at least four quantities of heat are totally supplied or carried off at different temperatures, a heat converter closed against the outside and operating as an absorption apparatus, said heat converter comprising at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, a steam power plant being in heat exchange relation with said heat converter, one of said heat consuming devices comprising a steam boiler in which steam is produced for said steam power plant.

4. In a system for the conversion of heat in which at least four quantities of heat are totally supplied or carried off at different temperatures, a continuously operating absorption apparatus comprising at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, at least one of said heat consuming devices serving to supply heat to a system combined with said heat converter.

5. In a system for the conversion of heat in which four quantities of heat are totally supplied or carried off at different temperatures, a heat converter comprising a plurality of absorption apparatus closed against the outside and each having at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, at least one of said heat consuming devices serving to supply heat to a system combined with said heat converter.

6. In a system for the conversion of heat in which four quantities of heat are totally supplied or carried off at different temperatures, a heat converter comprising a plurality of absorption apparatus closed against the outside and each having at least four main parts, i. e., at least two operating vapor developing parts and two parts in which operating vapor is converted into another state of aggregation, at least four outer heat reservoirs in which different temperatures prevail, said heat reservoirs comprising heat sources and heat consuming devices, and heat exchange means between said main parts of the heat converter, on the one hand, and said heat reservoirs, on the other hand, at least one of said heat consuming devices serving to supply heat to a system combined with said heat converter, and heat exchange means between one of said main parts of one of said absorption apparatus and a main part of a second absorption apparatus.

KURT V. NESSELMANN.
EDMUND ALTENKIRCH.